US012312223B2

(12) United States Patent
Kritzer

(10) Patent No.: US 12,312,223 B2
(45) Date of Patent: May 27, 2025

(54) AGILE MOBILE SCISSOR LIFT APPARATUS

(71) Applicant: BendPak, Inc., Santa Paula, CA (US)

(72) Inventor: Jeffrey S. Kritzer, Moorpark, CA (US)

(73) Assignee: BendPak, Inc., Agoura Hills, CA (US)

( * ) Notice: Subject to any disclaimer, the term of this patent is extended or adjusted under 35 U.S.C. 154(b) by 179 days.

(21) Appl. No.: 17/664,042

(22) Filed: May 18, 2022

(65) Prior Publication Data

US 2022/0402735 A1 Dec. 22, 2022

Related U.S. Application Data

(60) Provisional application No. 63/213,039, filed on Jun. 21, 2021.

(51) Int. Cl.
*B66F 9/065* (2006.01)
*B66F 9/075* (2006.01)

(52) U.S. Cl.
CPC .......... *B66F 9/065* (2013.01); *B66F 9/07509* (2013.01); *B66F 9/07559* (2013.01)

(58) Field of Classification Search
CPC .. B66F 9/065; B66F 9/07509; B66F 9/07559; B66F 7/065
See application file for complete search history.

(56) References Cited

U.S. PATENT DOCUMENTS

| | | |
|---|---|---|
| 291,882 A | 1/1884 | Daheney |
| 1,135,765 A | 4/1915 | Chapman et al. |
| 1,279,481 A | 9/1918 | Stuebing, Jr. |
| 1,295,698 A | 2/1919 | Collis |
| 1,390,487 A | 9/1921 | Black et al. |
| 1,763,535 A | 6/1930 | Nuttall |
| 2,399,043 A | 4/1946 | Klumb |
| 2,471,901 A | 5/1949 | Ross |
| 2,796,150 A | 6/1957 | Gambardella |
| 3,071,389 A | 1/1963 | Ulinski |
| 3,762,739 A | 10/1973 | Tabet |
| 4,082,195 A | 4/1978 | Wnek |
| 4,381,101 A | 4/1983 | Herrin |
| 4,880,220 A | 11/1989 | Buechler |
| 4,918,783 A | 4/1990 | Chu |
| 5,193,649 A | 3/1993 | Lee |

(Continued)

FOREIGN PATENT DOCUMENTS

| | | |
|---|---|---|
| CN | 105923568 A | 9/2016 |
| CN | 106938830 A | 7/2017 |

(Continued)

OTHER PUBLICATIONS amazon.com. “amazon_NPL” 13 . . . Feb. 17, 2007; p. 1, large picture; p. 4, second picture, first paragraph under the second picture.

*Primary Examiner* — Seahee Hong
(74) *Attorney, Agent, or Firm* — AVEK IP, LLC; Kent R. Erickson

(57) ABSTRACT

A mobile lift apparatus includes a mobile base frame with sets of height adjustable, triple caster units, frame mounted floor brakes, a load deck, scissor linkage engaged between the base frame and the load deck, and a load table movable on the load deck. An actuator is engaged with the scissor linkage to extend and retract the scissor linkage.

22 Claims, 13 Drawing Sheets

(56) References Cited

U.S. PATENT DOCUMENTS

| | | | | |
|---|---|---|---|---|
| 5,275,526 | A * | 1/1994 | Moseley | B66F 7/0625 414/537 |
| 5,394,959 | A | 3/1995 | Cullity et al. | |
| 5,425,433 | A | 6/1995 | Huber | |
| 5,615,451 | A | 4/1997 | Peterson et al. | |
| 6,321,878 | B1 | 11/2001 | Mobley et al. | |
| 6,877,764 | B2 | 4/2005 | Sagol | |
| 9,650,060 | B2 | 5/2017 | Kopp et al. | |
| 9,789,902 | B1 * | 10/2017 | Cui | B62D 7/1545 |
| 9,834,240 | B2 | 12/2017 | Vanderberg et al. | |
| 9,968,185 | B2 | 5/2018 | Blick et al. | |
| 10,471,972 | B1 | 11/2019 | Mackey | |
| 11,420,319 | B2 * | 8/2022 | Peterson | B66F 7/28 |
| 2004/0232660 | A1 | 11/2004 | Chen | |
| 2008/0012260 | A1 | 1/2008 | Ouyang et al. | |
| 2011/0049822 | A1 * | 3/2011 | Hinman | B25H 5/00 280/32.6 |
| 2012/0090093 | A1 | 4/2012 | Wurdeman | |
| 2018/0229748 | A1 | 8/2018 | Nakamura et al. | |
| 2020/0339350 | A1 | 10/2020 | Dooley et al. | |
| 2021/0246650 | A1 | 8/2021 | Lackey | |

FOREIGN PATENT DOCUMENTS

| | | | |
|---|---|---|---|
| CN | 207241751 | U | 4/2018 |
| CN | 109455207 | A | 3/2019 |
| CN | 110697620 | A | 1/2020 |
| CN | 111217285 | A | 6/2020 |
| CN | 111634848 | A | 9/2020 |
| CN | 211642234 | U | 10/2020 |
| CN | 217256098 | U | 8/2022 |
| DE | 3711662 | C2 | 2/1989 |
| DE | 29920750 | U1 | 4/2000 |
| JP | H09328299 | A | 12/1997 |
| JP | 3161076 | U | 7/2010 |
| JP | 2017128142 | A | 7/2017 |
| JP | 2021062764 | A | 4/2021 |
| WO | 2019052188 | A1 | 3/2019 |

* cited by examiner

AGILE MOBILE SCISSOR LIFT APPARATUS

CROSS-REFERENCE TO RELATED APPLICATIONS

This application claims priority to U.S. Provisional Application Ser. No. 63/213,039 filed Jun. 21, 2021, and titled "MOBILE SCISSOR LIFT APPARATUS, the disclosure of which is hereby incorporated herein in its entirety by reference.

BACKGROUND OF THE INVENTION

Field of the Invention

This invention relates to mobile lift apparatus and, more particularly, to such apparatus which can be accurately and conveniently positioned for load lifting and lowering and parked for stability during such lifting and lowering of a load.

Background & Description of Related Art

The maintenance and repair of vehicles sometimes requires the removal and reinstallation of a relatively large and heavy component, such as a transmission, transaxle, motor, or the like for repair or replacement. Access to such components from beneath the vehicle in a lifted position may be required.

Electrically propelled vehicles, such as automobiles, employ very large rechargeable battery packs to operate propulsion motors. Such vehicles are referred to as electric vehicles (EV's) when propelled solely by a battery or as hybrids if an internal combustion engine is incorporated into the vehicle. Although the batteries for electric vehicles typically have long lives, replacement may eventually be required. Manufacturing defects in the batteries and other circumstances may require earlier replacement. The batteries for electric vehicles may range in weight from about 200 to 500 kilograms (400 to 1200 pounds) or more for passenger vehicles and are usually accessible from beneath the vehicle for replacement.

There are many mechanisms for lifting and lowering automotive components during vehicle maintenance. Such lift mechanisms are often mobile to optimize placement thereof below the component to be manipulated and to facilitate use of the same lift mechanism for a wide range of automotive components. It is desirable for a mobile lift mechanism to be parked in a stationary position for stability during lifting and lowering of a component and released from a parked condition for moving the component supported by the lift mechanism. It is often more convenient to lift and lower automotive components beneath a vehicle when the vehicle is supported by a two-post lift rather than a single post lift. An exemplary two-post lift arrangement is disclosed in U.S. Pat. No. 9,150,395, the disclosure of which is incorporated herein in its entirety by reference.

The battery pack or battery of an electric vehicle is typically a large, relatively flat assembly which is secured within a large shallow recess or well on the underside of the vehicle by removable fasteners. The battery is electrically connected to the vehicle electrical motor and systems by separable connectors. For removal, the battery is supported from below while fasteners are removed. The battery is then lowered which enables components of the electrical connectors to separate. The process for installing a new battery reverses the removal process. However, installation of the battery requires precise alignment of components of the mechanical fasteners and electrical connectors prior lifting the battery into the battery recess. Thus, there is a need for a mobile lift apparatus with a high degree of agile mobility to accurately position such a battery below a vehicle prior to lifting the battery into place beneath the vehicle

SUMMARY OF THE INVENTION

The present invention provides embodiments of a mobile lift apparatus which can be conveniently parked for stability during lifting and lowering of a load and released from the parked condition for moving the lift apparatus with the load or the lift apparatus alone.

An embodiment of a mobile lift apparatus includes: a horizontal base frame having front and rear frame ends and opposite lateral frame sides, a powered lift mechanism mounted on the base frame and operable to lift and lower a load; a pair of rear wheels mounted in laterally space relation at the rear frame end, a pair of legs extending downwardly from the base frame in laterally spaced relation adjacent the front frame end, the legs being of a length to enable contact with a support surface of the apparatus, a front wheel unit including a front wheel, a pull lever or handle connected to the frame front end to enable movement of the apparatus, and a tilt actuator engaged between the front wheel unit and the base frame and selectively operable to enable tilting of the frame front end to thereby lift the legs out of support surface contact for movement of the apparatus and to lower the legs to support surface contact to stabilize the apparatus for operation of the powered lift mechanism.

In an embodiment of the apparatus, the front wheel unit is connected to the frame front end to enable pivoting the front wheel about a substantially vertical steering axis relative to the base frame. The pull lever may be connected to the frame front end by way of the front wheel unit and engaged with the front wheel unit. The pull lever may also be engaged with the tilt actuator in such a manner as to enable operation thereof to lift and lower the legs. Each of the legs may include an adjustably extendible surface contact pad at a lower end thereof.

In an embodiment of the apparatus, the powered lift mechanism includes a lift deck to support a load to be lifted or lowered, a scissor linkage engaged between the deck and the base frame in such a manner as to lift and lower the deck respectively by extension and retraction of the scissor linkage, and a linear lift motor engaged with the scissor linkage in such a manner as to selectively extend and retract the scissor linkage to respectively lift and lower the deck. In an embodiment of the lift mechanism, the lift deck may also include a plurality of support arms extending outwardly from the deck and having arm outer ends with load support pad upstanding therefrom, the support pads cooperating to support a load on the lift mechanism.

The lift deck may be engaged with the lift mechanism in such a manner as to enable selectively fixing the deck in an angular attitude relative to the base frame. For this purpose, the lift mechanism may include a tilt frame engaged with the lift deck in such a manner as to enable selectively fixing the tilt frame relative to the lift deck about a tilt frame axis. In combination with the tilt frame, the lift mechanism may include a load support table pivotally engaged with the tilt frame in such a manner as to enable selectively fixing the table at an angle relative to the tilt frame about a table axis substantially perpendicular to the tilt frame axis.

The legs may extend above the base frame to form front deck supports, and a pair of laterally spaced rear deck supports may extend above the base frame near the rear frame end. The front and rear deck supports are engaged by the lift deck in lowered position thereof to thereby support the lift deck.

An embodiment of an agile mobile lift apparatus includes a base frame having front and rear frame ends and opposite lateral frame sides; a lift mechanism mounted on the base frame and operable to lift and lower a load; a respective caster unit positioned at each intersection of a frame end and a frame side, the caster units cooperating to enable the base frame to be moved about a support surface of the apparatus; and a floor brake mechanism secured to the base frame, the floor brake mechanism including a brake pad which is selectively extended into braking contact with the support surface in a brake position thereof to secure a position of the apparatus and which is retracted to a released position to enable movement of the apparatus on the support surface. The floor brake may be latched in the brake position thereof and released to retract the brake pad out of engagement with the support surface. The apparatus may include a respective brake mechanism secured to each of the frame sides in laterally aligned relation. The apparatus may include a steering handle engaged with the base frame to facilitate controlling the direction of movement of the apparatus.

In an embodiment of the apparatus, each caster unit includes a swivel caster which is adjustable in height to enable leveling of the apparatus on an uneven support surface. In an embodiment, the caster unit includes a caster plate pivotally engaged with the base frame to enable pivoting about a substantially vertical plate axis; and a plurality of swivel casters pivotally engaged with the caster plate in mutually spaced relation and in such a manner as to enable pivoting about respective, substantially vertical swivel axes. Such a caster unit may include a substantially vertical caster unit shaft engaged with the base frame in such a manner as to enable a vertical position of the shaft to be selectively adjusted relative to the base frame; a triangular caster plate pivotally engaged with the caster unit shaft to enable pivoting about a substantially vertical plate axis extending through the caster unit shaft; and three swivel casters pivotally engaged with the caster plate in a spaced apart, triangular relation and in such a manner as to enable pivoting about respective, substantially vertical swivel axes.

In an embodiment of the apparatus, the lift mechanism may include a substantially planar load deck adapted to support a load to be lifted by the apparatus; a scissor linkage connecting the load deck to the base frame to enable lifting or lowering of the load plate respectively by extension or retraction of the scissor linkage; and an actuator engaged with the scissor linkage in such a manner as to enable selective extension and retraction of the scissor linkage. The lift mechanism may also include a substantially planar load table supported on the load deck in such a manner as to enable limited movement of the load table relative to the load deck to thereby adjust a position of a load positioned on the load table. The lift mechanism may include an array of bearings engaged between the load deck and the load table to facilitate movement of the load table relative to the load deck. The load table may have a limit member which engages the load deck in such a manner as to limit movement of the load table relative to the load deck. In an embodiment of the lift mechanism, the load table may include depending limit members which engage an outer periphery of the load deck to thereby limit relative movement of the load table.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE PREFERRED EMBODIMENTS

Figure 4:
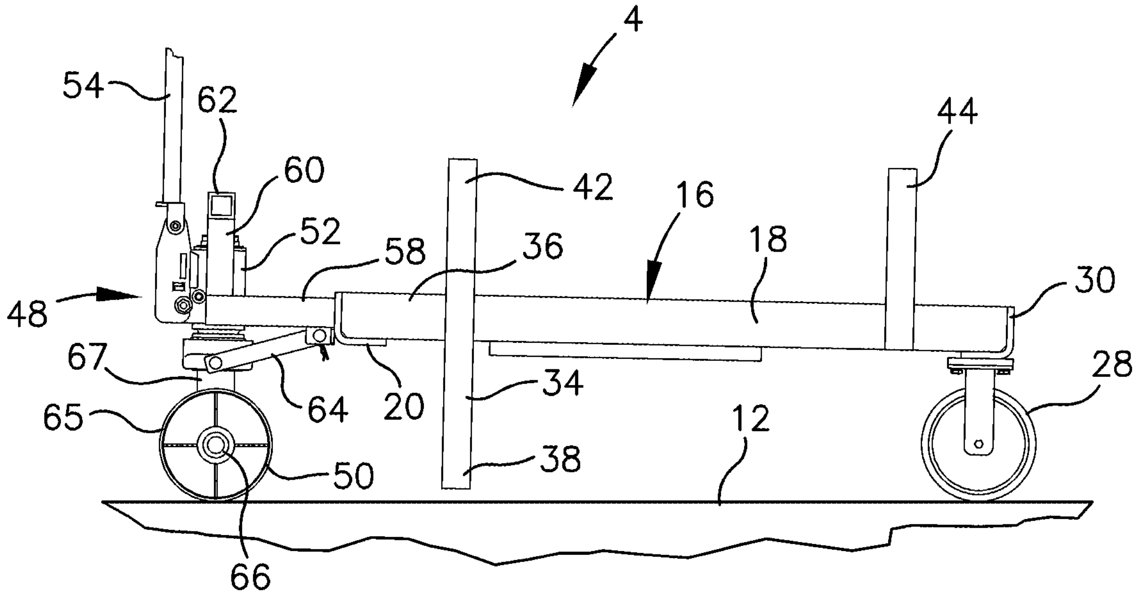
FIG. 4 is an enlarged fragmentary side elevation view with the lift deck and the lift mechanism removed illustrating a tilt actuator in an extended condition to lift lower ends of front legs from a support surface to enable movement of the apparatus.
Figure 5:
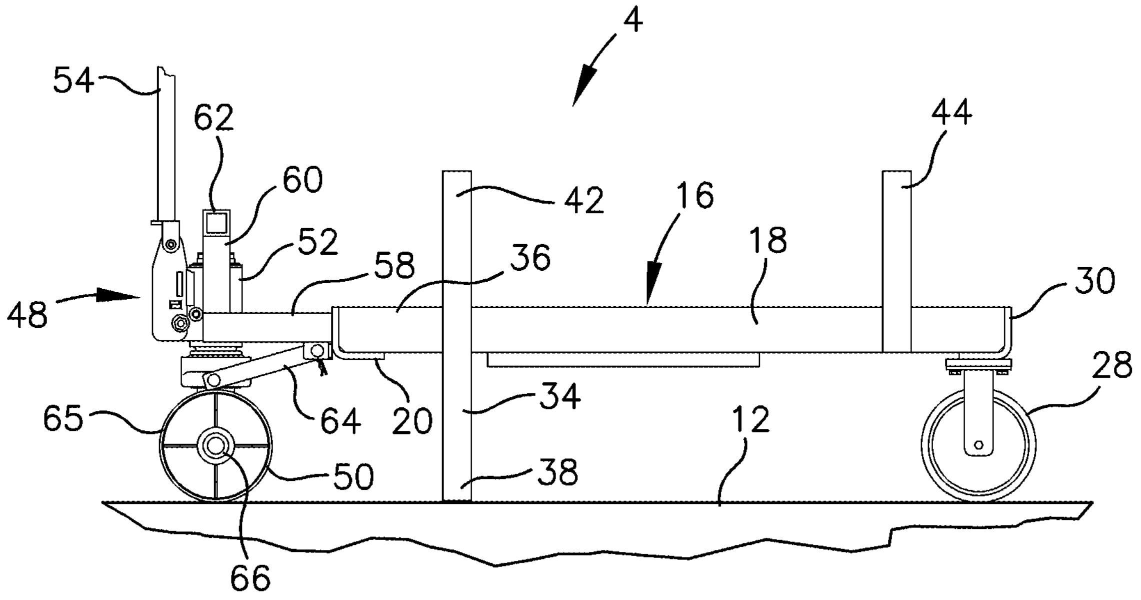
FIG. 5 is a view similar to FIG. 4 and illustrates the tilt actuator in a retracted condition to enable contact of lower ends of the front legs with the support surface to facilitate lifting and lowering a load by the apparatus.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure Referring to the drawings in more detail, the reference number 1 generally designates an embodiment of a mobile scissor lift apparatus according to the present invention. The lift apparatus 1 generally includes a mobile base 4 that is jackable and steerable, a motorized or powered lift assembly 6 supported by the base 4, and a lift platform assembly 8 engaged by the lift assembly 6 to be lifted or lowered thereby. The jackable, mobile base 4 enables the lift apparatus 1 to be selectively advanced between a lowered position in which a portion of the base frictionally engages a garage floor to resist movement of the lift apparatus 1 relative to a support surface 12 such as a shop floor as generally shown in FIG. 5 and a raised position in which the lift apparatus 1 is freely rollable relative to the support surface 12 as generally shown in FIG. 4. The lift platform 8 supports a load 10 (FIG. 2) to be lifted or lowered by operation of the lift assembly 6.

The illustrated mobile base 4 includes a base frame 16 formed by laterally spaced left and right, side members 18 connected by longitudinally, or fore and aft, spaced front and rear end members 20. The base frame members 18 and 20 may be formed of elongated angle sections, or the like which are joined, as by welding. The base frame 16 may include a lower wall 22 to support components of a hydraulic power and control assembly 24 (FIG. 14), as will be described below.

The base frame 16 includes a pair of laterally spaced rear wheels 28 mounted at a rear end 30 of the base frame near junctions of the rear end member 20 and rear ends of the side members 18. The rear wheels 28 may be formed as casters, capable of swiveling about vertical axes or may be fixed in orientation. It is also foreseen that the wheels 28 could be provided with brakes (not shown) which could be applied during lifting or lowering of the lift platform assembly 8 for greater stability. Laterally spaced supports or legs 34 are joined to the side members 18 of the base frame 16 and extend downwardly therefrom such that lower ends 38 thereof selectively contact the support surface 12. The lower ends 38 may be provided with surface contact pads 40 (FIG. 7) which can be adjustably extended or retracted to contact the support surface 12 to thereby position the lift platform assembly 8 in a level orientation. On the illustrated base frame 16, upper ends 42 of the legs 34 extend upwardly and form front, deck support members which cooperate with upstanding, rear, deck support members 44 joined to the side frame members 18 near the rear frame end 30 to support the lift platform assembly 8 in a lower position thereof. The front and rear deck support members 42 and 44 also form stops or a lower height limit during lowering of the lift platform assembly 8.

A tongue structure or tongue 46, centered at the front end 36 of the base frame 16, extends forwardly from the front end member 20 and is supported on a steerable, frame lifting assembly 48. The steerable, frame lifting assembly 48 includes a wheel assembly 50 mounted on a lower end of a jack 52 and a handle 54, as will be described further below. In general, the jack 52 can be operated to raise the tongue 46, base frame 16 and wheel assembly 50 relative to the rear wheels 28 to tilt the base frame 16 about the rear wheels 28 and to lift the lower ends 38 of the legs 34 from the support surface 12 to facilitate maneuvering the lift apparatus 1 and, conversely, retract the tongue 46 and base frame 16 relative to the wheel assembly 50 to lower the legs 34 into contact or engagement with the support surface for stability during operation of the powered lift assembly 6 such as while lifting or lowering the lift platform assembly 8.

Referring to FIGS. 1-5, the illustrated tongue structure 46 includes a pair of laterally spaced lower tongue members 58 extending forwardly from the front end member 20 and having riser members 60 extending upwardly from ends thereof. The riser members 60 support a cross member 62 extending between upper ends of the riser members 60.

The jack 52 is rotatably supported on a jack base 63 which is connected to the front frame end member 20 by tie links 64 connected to lateral sides of the jack base 63. An upper end of the jack 52 is connected to the middle of the cross member 62.

The wheel assembly 50 of the embodiment shown, comprises a pair of front wheels or rollers 65 rotatably mounted on an axle 66 connected to the lower end of a wheel support shaft 67 which is connected to a bottom of the jack 52. The wheel support shaft 67 extends through and below the jack base 63 and is rotatably with the jack 52 relative to the jack base 63. (See FIG. 4).

The jack 52 in the embodiment shown, may be constructed as a conventional hydraulic cannister jack 52 with a piston mounted in a cannister containing hydraulic fluid and extendable and retractable relative to the cannister. A pump mounted on the exterior of the cannister is operable to pump hydraulic fluid from an exterior chamber of the cannister into the bottom of a cylinder surrounding the piston to extend the piston relative to the cannister and lift the tongue 46 and base frame 16 relative to the wheel assembly 50. A release valve is operable to allow hydraulic fluid to flow out of the cylinder and back into the cannister to selectively lower the piston.

The handle or lever 54 is pivotally connected at a lower end to the jack 52 such that downward pivoting of the handle 54 engages or operates the pump to pump hydraulic fluid from the chamber to the cylinder housing the piston. The lower end of the handle is connected to the jack 52 in such a manner as to permit manual rotation or steering of the front wheels 65 of the wheel assembly 50 about a substantially vertical steering axis. A cylinder release lever 70 may be provided on the handle 54 which may be operated to operate the release valve to cause retraction of the piston.

When the piston of the jack 52 is extended, the base frame 16 is tilted up about the wheels 28 to lift the lower ends 38 of the legs 34 out of contact with the support surface 12 to facilitate moving the apparatus 1 on the surface 12. Normally, the base frame 16 is only raised to the mobile position shown in FIG. 4 when the lift platform assembly 8 is in a lowered position. Conversely, the powered lift assembly 6 is only activated to lift or lower the lift platform assembly 8 when the base frame 16 is in the more stable parked position shown in FIG. 5, with the lower ends 38 of the legs 34 contacting the support surface 12. The frame lifting assembly 48 is comparable to components employed on pallet jacks and skid jacks. Further details of such jack units can be found in U.S. Pat. Nos. 2,399,043 and 3,462,167, the disclosures of which are incorporated herein, in their entireties, by reference.

Figure 1:
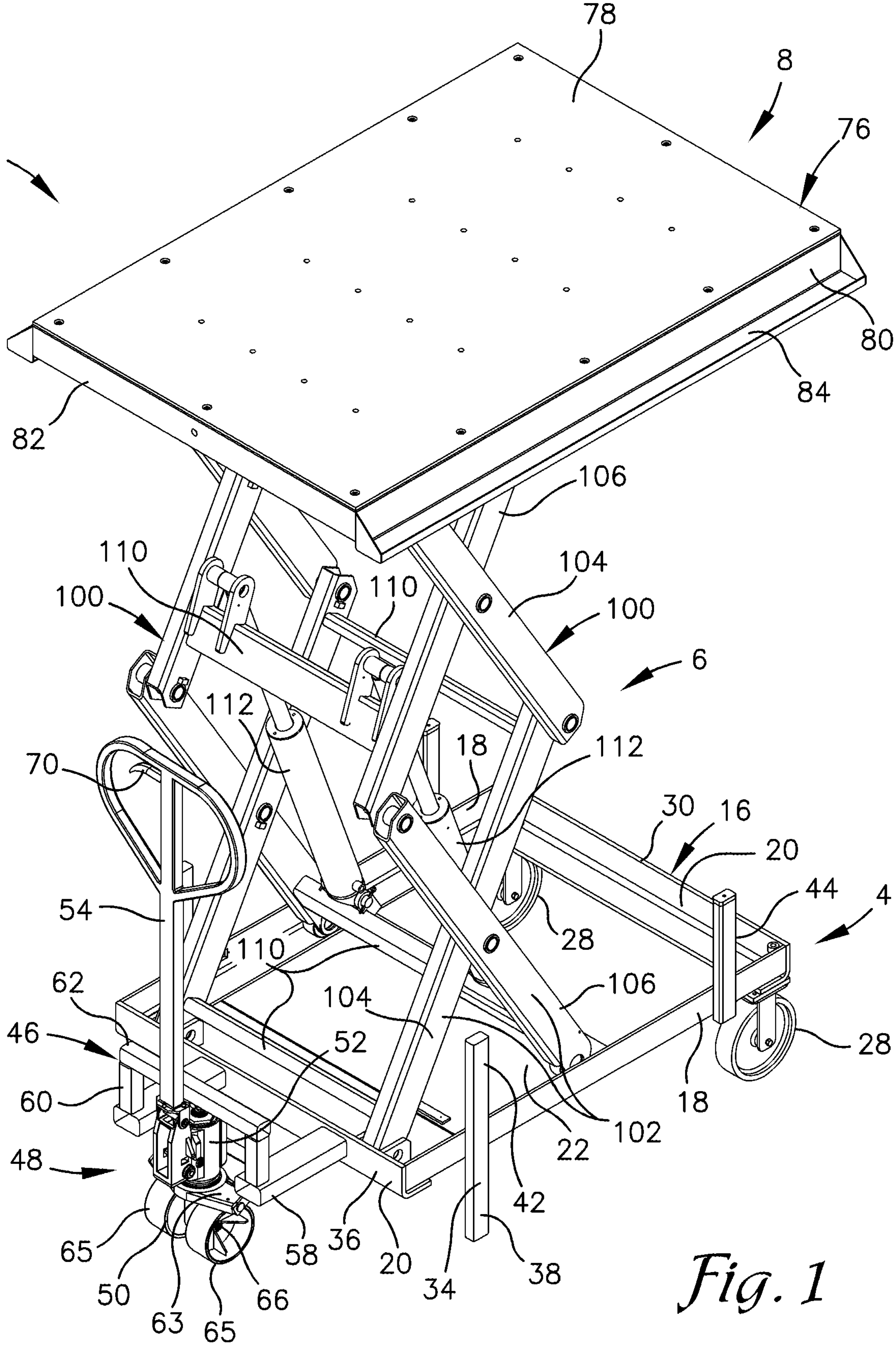
FIG. 1 is a perspective view of a mobile scissor lift apparatus according to the present invention, shown in with a lift deck in a raised position by a powered lift mechanism.
Figure 2:
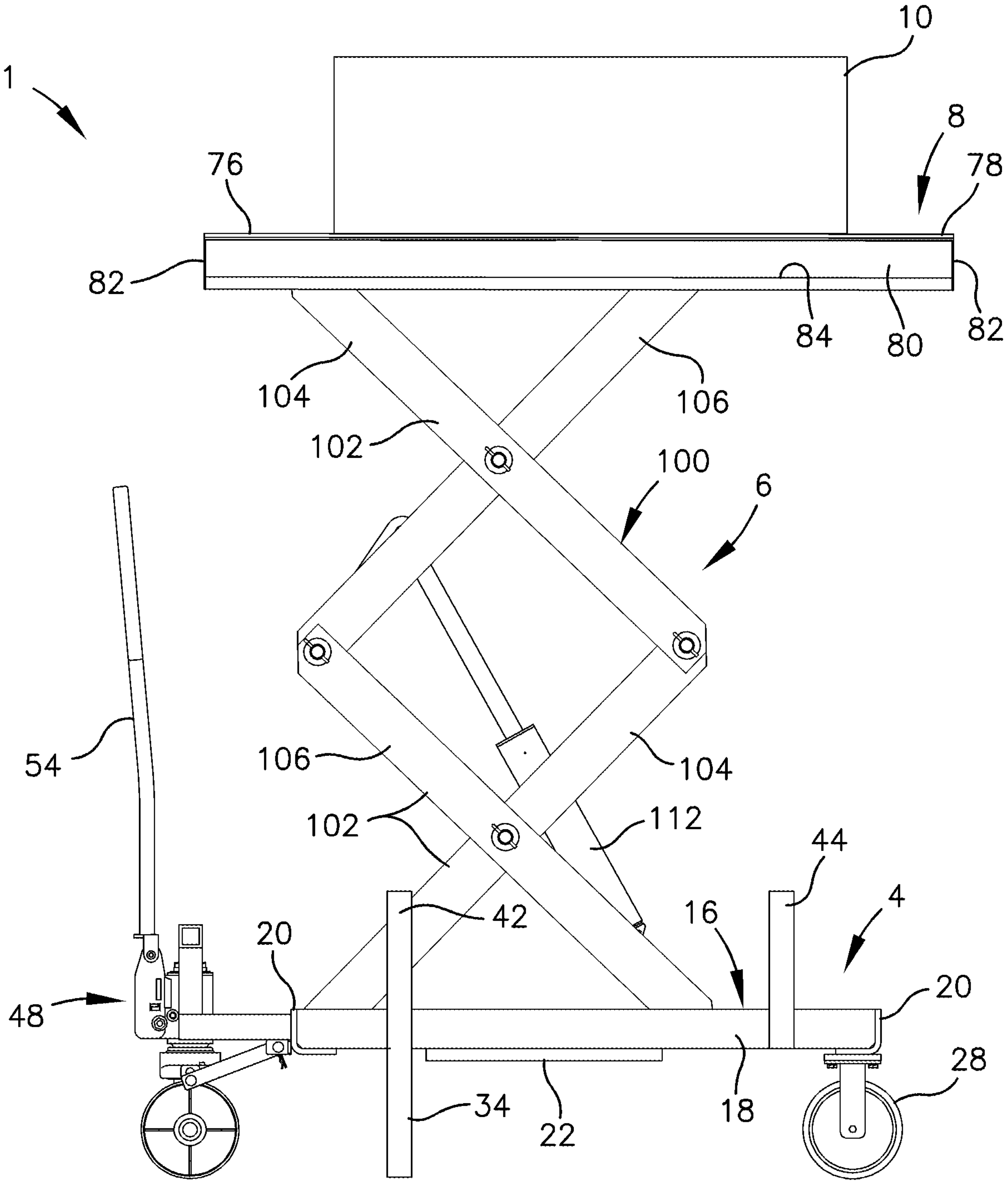
FIG. 2 is a somewhat enlarged side elevation view showing the lift deck supporting a load in a raised position.
Figure 3:
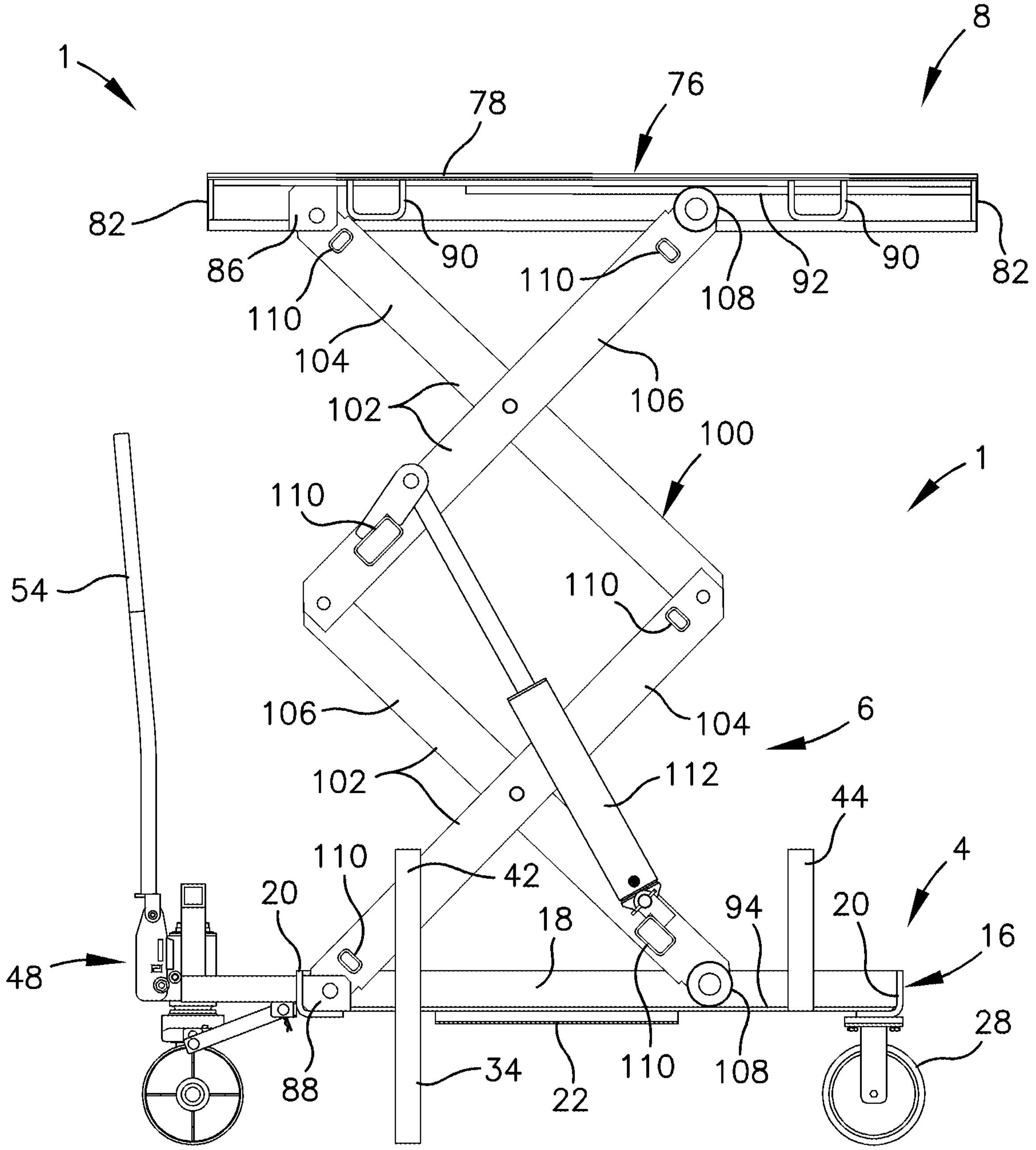
FIG. 3 is a is a side elevation view at a somewhat reduced scale with portions of the lift deck, a scissor mechanism, and a base frame removed to illustrate components of a powered lift mechanism of the apparatus.

Referring to FIGS. 1-3, the illustrated lift platform assembly 8 includes a rectangular load support platform or deck 76 formed as a shallow, downwardly open, box structure by an upper deck plate 78, left and right side plates 80, and front and back end plates 82 and joined, as by welding. The side plates 80 may be provided with tool channels 84 extending therealong, for example, to receive mechanics' tools while working on a vehicle. It is foreseen that the end plates 82 could also be provided with such tool channels. A lower side of the upper deck plate 78 has laterally spaced sets of upper scissor clevises 86 (FIG. 3) joined thereto and vertically aligned with sets of lower scissor clevises 88, illustrated as joined to the front end member 20 of the base frame 16, as will be described further below. A lower side of the deck 78 may also be provided with front and rear sets of height stop members 90 which are aligned with and which engage upper ends of the front and rear deck supports 42 and 44. The height stop members 90 limit lower movement of the lift platform assembly by engagement with the front and rear deck supports 42 and 44. The lower side of the upper deck plate 78 may also be provided with left and right upper scissor roller plates 92, as will be described below. The side members 18 of the base frame 16 may also be provided with similar lower scissor roller plates 94.

A layer 96 (FIGS. 6 and 7) of ultra-high molecular weight polyethylene (UHMW-PE) or other low friction polymer or material may be secured to the upper surface of the upper deck plate 78 to facilitate moving heavy parts or loads 10, such as heavy battery packs on the surface to align the part 10 with the portion of a vehicle to which it is secured such as for example aligning bolts or bolt holes on the part with bolt holes or bolts on the vehicle frame. The low friction layer 96 also minimizes surface damage to battery packs and other components and protects the surface of the deck plate 78 from chemical spills and abrasions or damage when sliding heavy drive train components or battery packs on the surface of the deck plate. The surface contact pads 40 may also be used to adjust the orientation of the upper deck plate 78 and a part 10 supported thereon fore and aft and side to side to align the orientation of the part 10 with the portion of the vehicle to which it is to be attached.

Referring to FIGS. 2 and 3, the powered lift assembly 6 supports the lift platform assembly 8 on the mobile jack assembly 4 and is operable to lift and lower the lift platform assembly 8 relative thereto, along with any load 10 positioned thereon. The lift assembly 6 includes left and right scissor or scissors mechanism 100 which are supported on the left and right side members 18 of the base frame 16. Each of the illustrated scissor mechanisms 100 includes laterally spaced left and right, vertically connected sets of scissor link pairs 102 of a link 104 and a link 106 which are pivotally connected in the middle of each link. Each scissor pair 102 has a connected end scissor link 104 which has an end thereof pivotally connected end to one of the scissor devises 86 or 88 and a roller end scissor link 106 having a scissor roller provided at an thereof. Each of the upper connected end links 104 is pivotally connected at opposite ends thereof to a corresponding lower connected end link 104. Similarly, each of the upper roller end links 106 is pivotally connected at an opposite end to a corresponding lower roller end link 106.

Lateral scissor spacers 110 extend between corresponding upper and lower links 104 and 106. Left and right linear motors 112, such as hydraulic cylinders, extend between lateral spacers 110 between sets of the links, such as the roller end links 106. Extension of the motors 112 causes extension of the scissor mechanisms 100 to lift the lift platform assembly 8 while retraction of the motors 112 causes retraction of the scissor mechanisms 100 to lower the assembly 8. As the scissor mechanisms 100 are raised or lowered, the rollers 108 at the ends of the roller end links 106 roll, respectively forwardly or backwardly, along the upper and lower roller plates 92 and 94.

Figure 14:
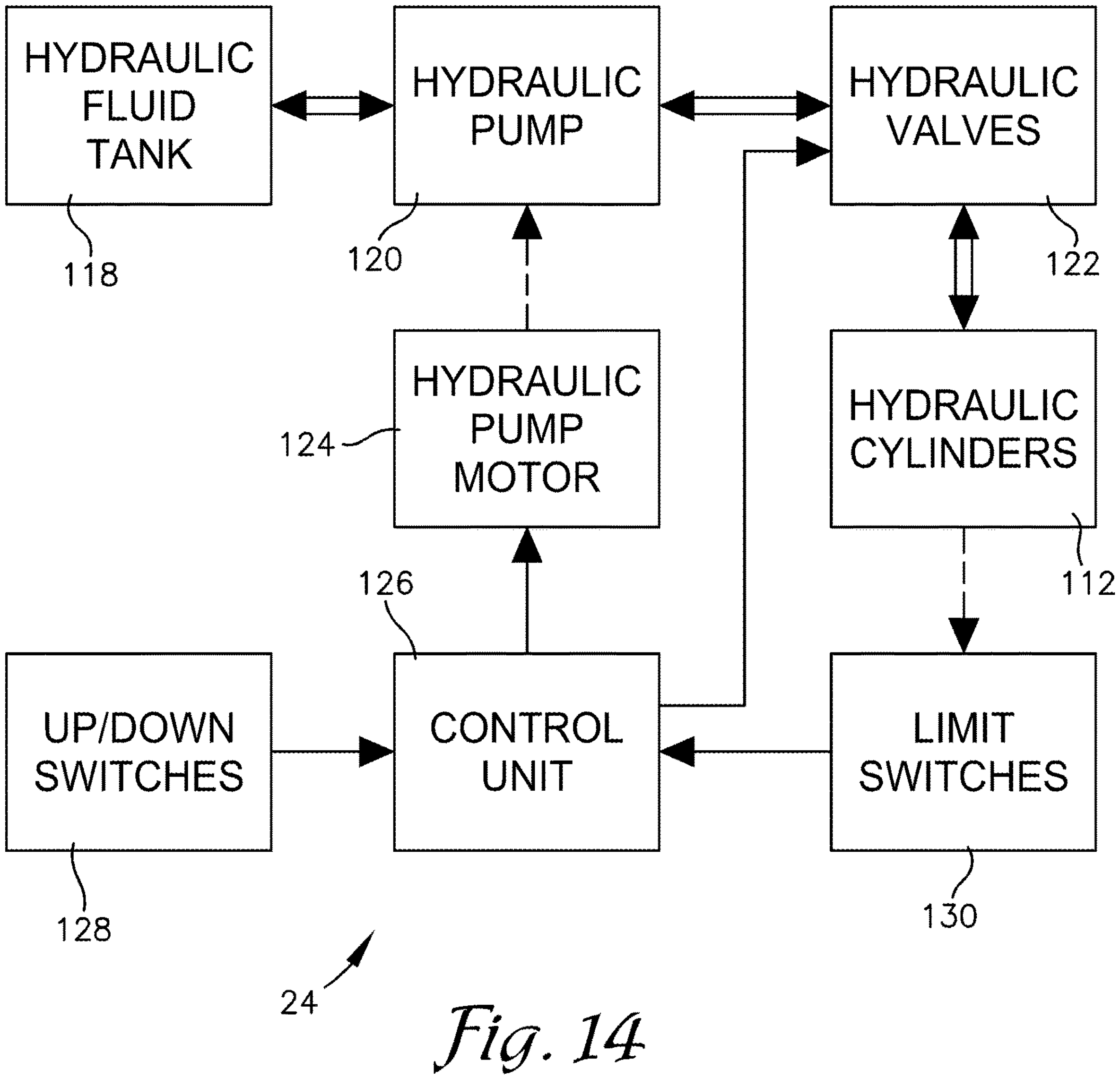
FIG. 14 is a simplified block diagram of components of a lift control system for controlling operation of the powered lift system.

Referring to FIG. 14, the illustrated hydraulic control system or assembly 24 includes a hydraulic fluid tank or reservoir 118, a hydraulic pump 120, hydraulic valves 122, and the hydraulic cylinders or linear motors 112. The pump 120 is driven by a hydraulic pump motor 124, as controlled by a hydraulic control unit 126 (FIGS. 6 and 14) to pump hydraulic fluid from the tank 118 through the valves 122, as controlled by the control unit 125. The control unit 126 includes up/down switches 128 to selectively cause the system 24 to raise or lower the lift platform assembly 8. The system 24 may include limit switches 130 (FIGS. 7 and 14) which are actuated near the desired upper and lower limits of desired travel of the lift platform assembly 8. The system 24 may be configured so that to lower the assembly 8, the valves 122 are actuated in such a manner to enable fluid to drain from the cylinders 112 through the pump 120, back into the tank 119. Alternatively, the motor 124, pump 120, and valves 122 may positively pump fluid from the cylinders 112 back to the tank 118.

Figure 6:
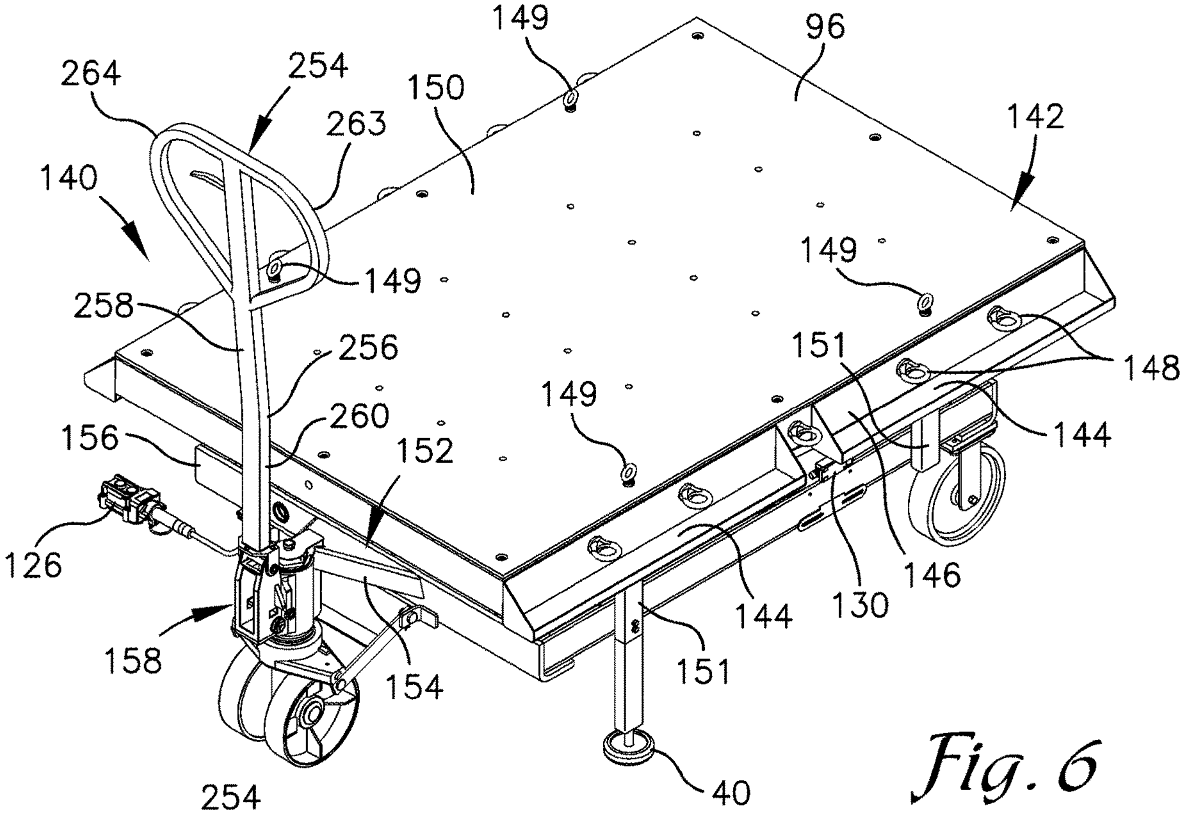
FIG. 6 is a perspective view of a modified embodiment of the lift apparatus having a first modified lift deck, shown in a lowered position thereof.
Figure 7:
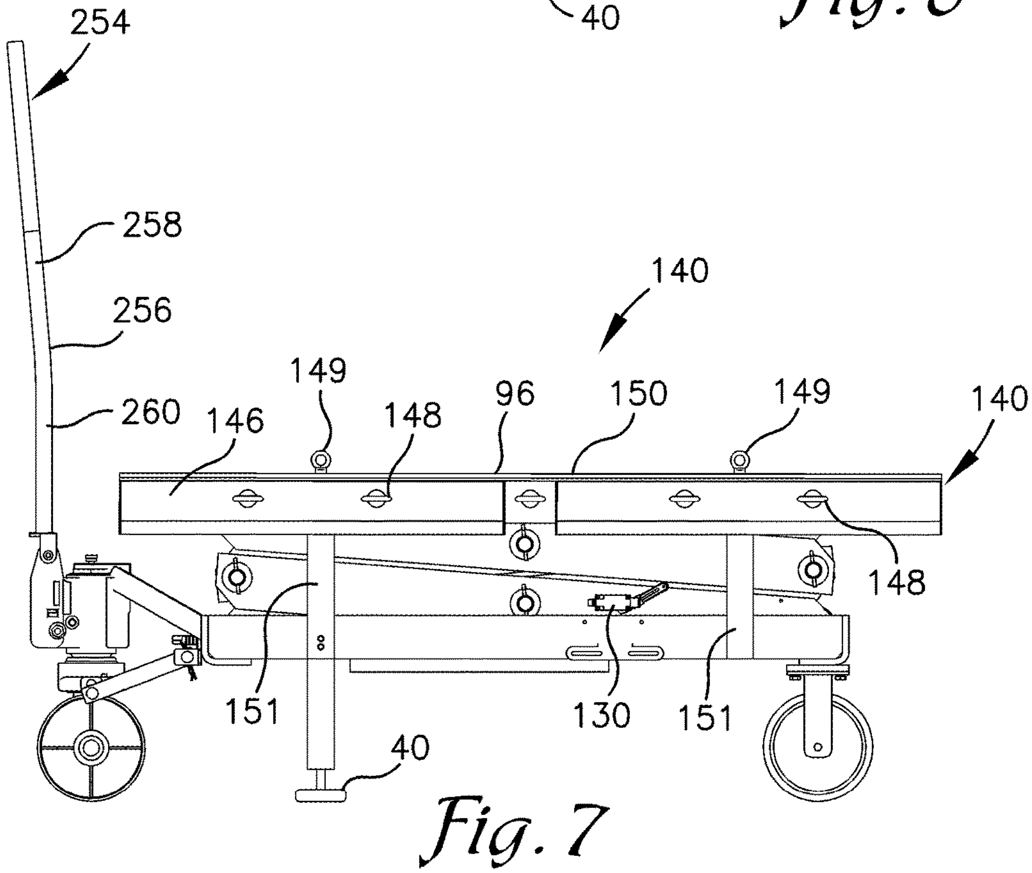
FIG. 7 is a side elevation view of the modified embodiment in the lowered position thereof.
Figure 8:
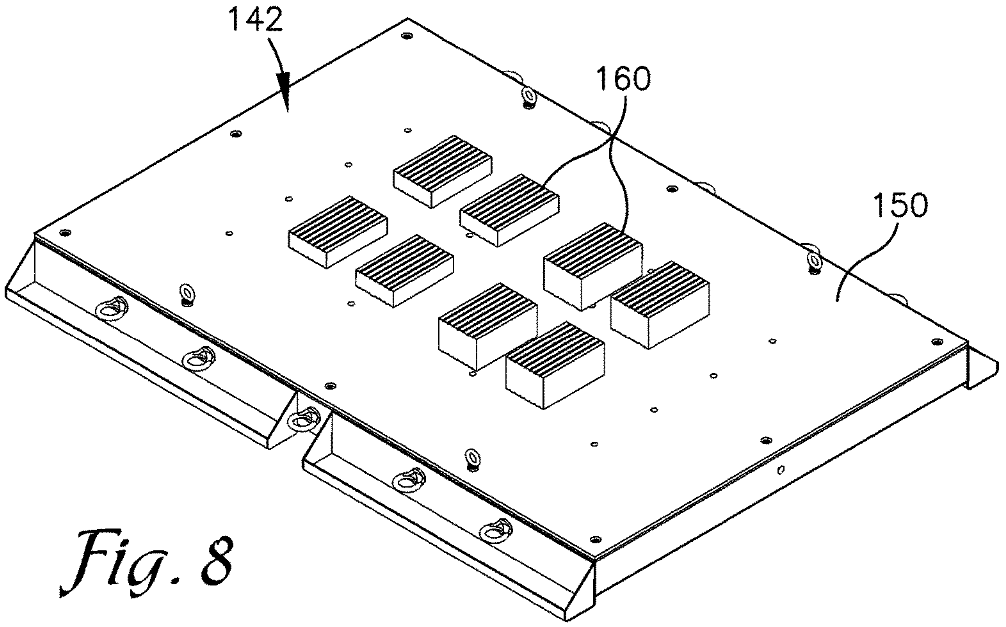
FIG. 8 is a perspective view of the first modified lift deck and illustrates support blocks for use therewith to support irregularly shaped loads to be manipulated by the apparatus.

Referring to FIGS. 6, 7, and 8, a modified embodiment 140 of the mobile scissor lift apparatus 1 is shown. The illustrated apparatus 140 includes a modified lift platform assembly 142 having a pair of separated tool channels 144 on each of a pair of side members 146 of the assembly 142. The assembly 142 includes a plurality of tie-down rings 148 which may be removably threaded into threaded holes formed in the side members 146. The rings 148 enable a load 10 to be secured to the assembly 142 during raising and lowering thereof and maneuvering of the apparatus 140. The apparatus 140 may be provided with packing eyebolts 149 which secure the lift platform assembly 142 in the lowered condition, as when positioned in a packing crate (not shown). The eyebolts 149 may be threaded through the upper deck plate 150 into upper ends of front and rear deck support members 151, similar to the upper ends 42 of the legs 34 and rear supports 44 of the apparatus 1. The eyebolts 149 may also be used to facilitate lifting the apparatus 140 from such a packing crate and may be removed to enable use of the apparatus 140.

The illustrated apparatus 140 includes a modified tongue structure 152 which is simplified in construction. The tongue structure 152 includes a pair of tongue members 154 extending angularly from a front base frame member 156 to a jack unit 158 which may be substantially similar to the jack unit 48. In other respects, the modified apparatus 140 is substantially similar to the apparatus 1. FIG. 8 illustrates the assembly 8 having a plurality of spacer blocks 160 of different sizes. The blocks 160 may be used, for example, to support a load 10 which has an irregular shape in a desired orientation on the deck plate 150 during lifting or lowering of the load 10.

The embodiment of the mobile scissor lift apparatus 140 shown in FIGS. 6 and 7 also includes a modified handle 254 which is adapted to facilitate movement and steering of the scissor lift apparatus 140. The handle 254 includes a stem 256 and a grip 258. A lower end of the handle 254 is pivotally connected to the jack unit 48 to operate the pump included therein. An upper segment or section 258 of the handle 254 is bent relative to a lower segment or section 260 at an acute angle which in the embodiment shown is eighteen degrees with the upper section 258 angling away from the upper deck plate 150 and base frame 16 when the lower section 260 of the handle 254 extends vertically. It is foreseen that an angle of the upper section 258 of the handle 254 relative to the lower section 260 of the handle 254 may be between 15 and 20 degrees and provide improved steering and maneuverability of the lift apparatus 140 by a user. The grip 258 is formed from left and right, curved grip segments 263 and 264 each extending outward from an upper end of the handle 254 and curving back downward and inward and into contact with the upper section 258 of the handle 254 in spaced relation below the upper end thereof.

Figure 9:
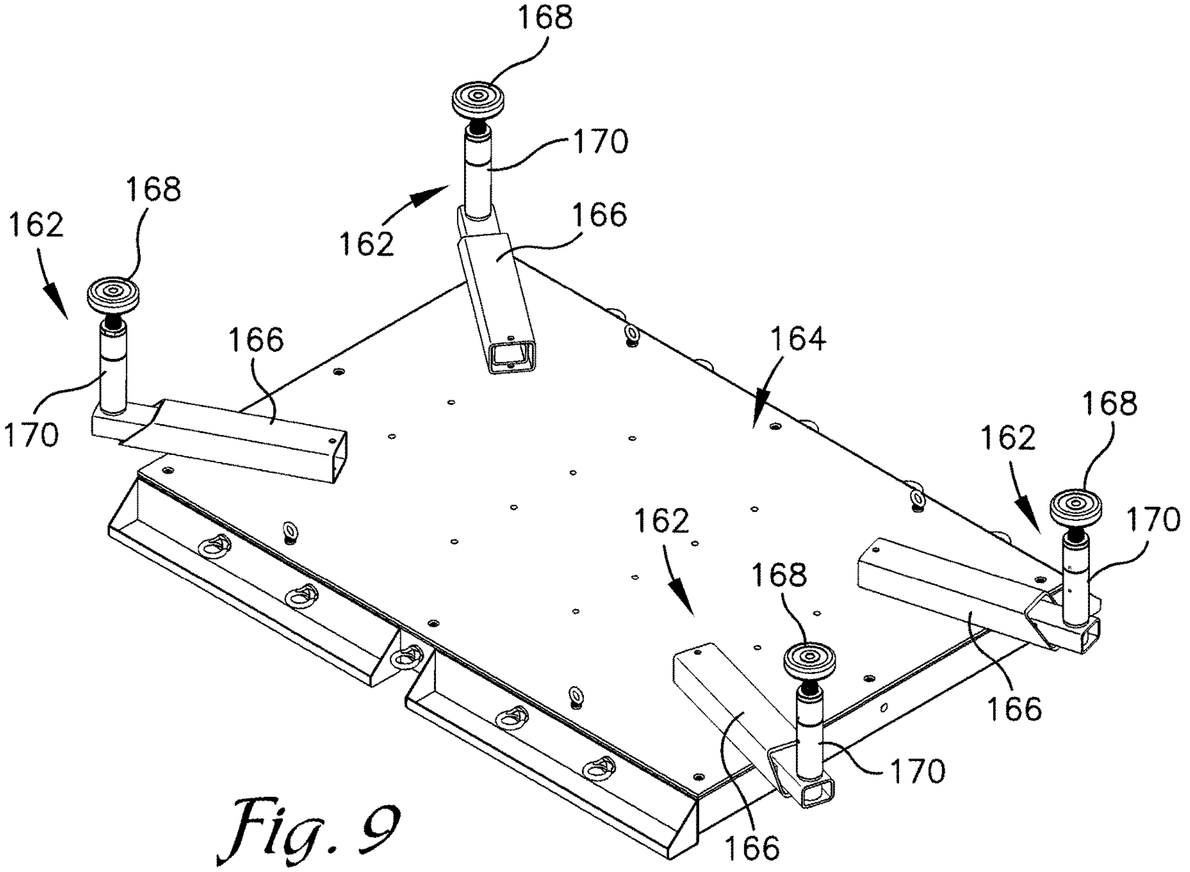
FIG. 9 is a perspective view of a second modified lift deck having load support arms extending beyond a periphery of the deck, with load support pads upstanding from outer ends of the arms.
Figure 10:
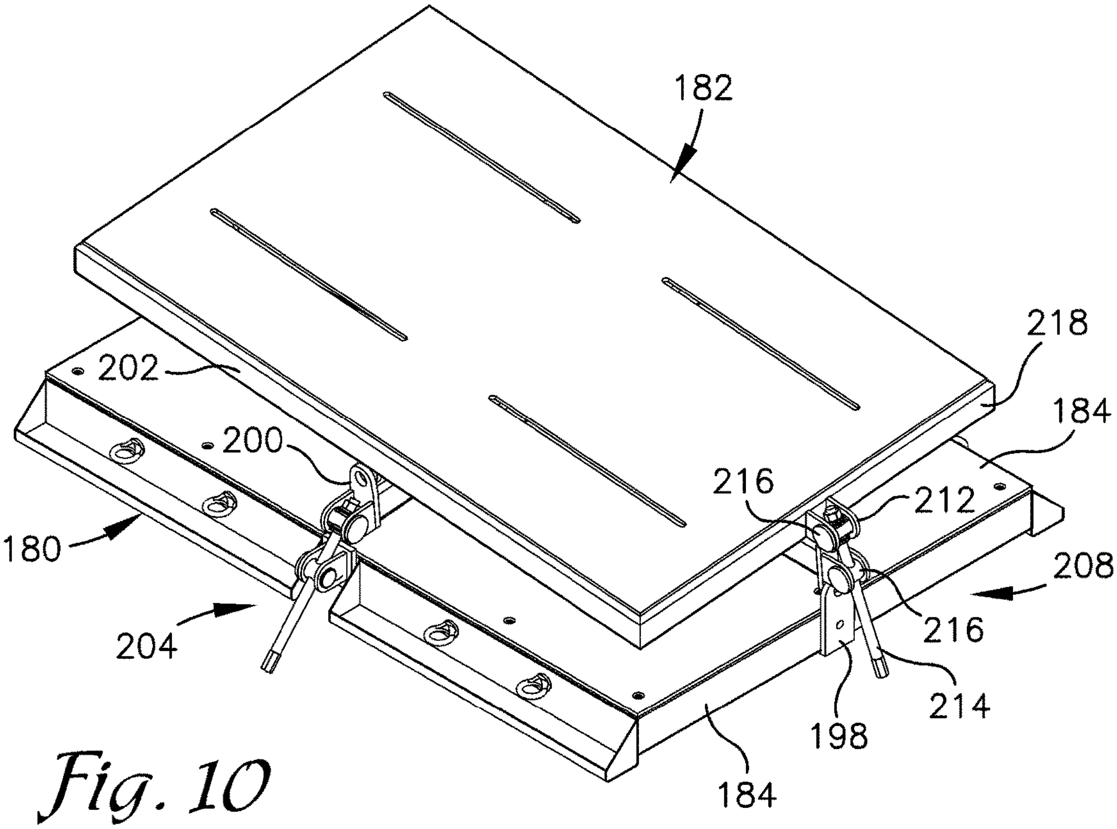
FIG. 10 is a perspective view of a second modified lift deck having a tilt table supported thereon to enable tilting the table relative to the lift deck.
Figure 11:
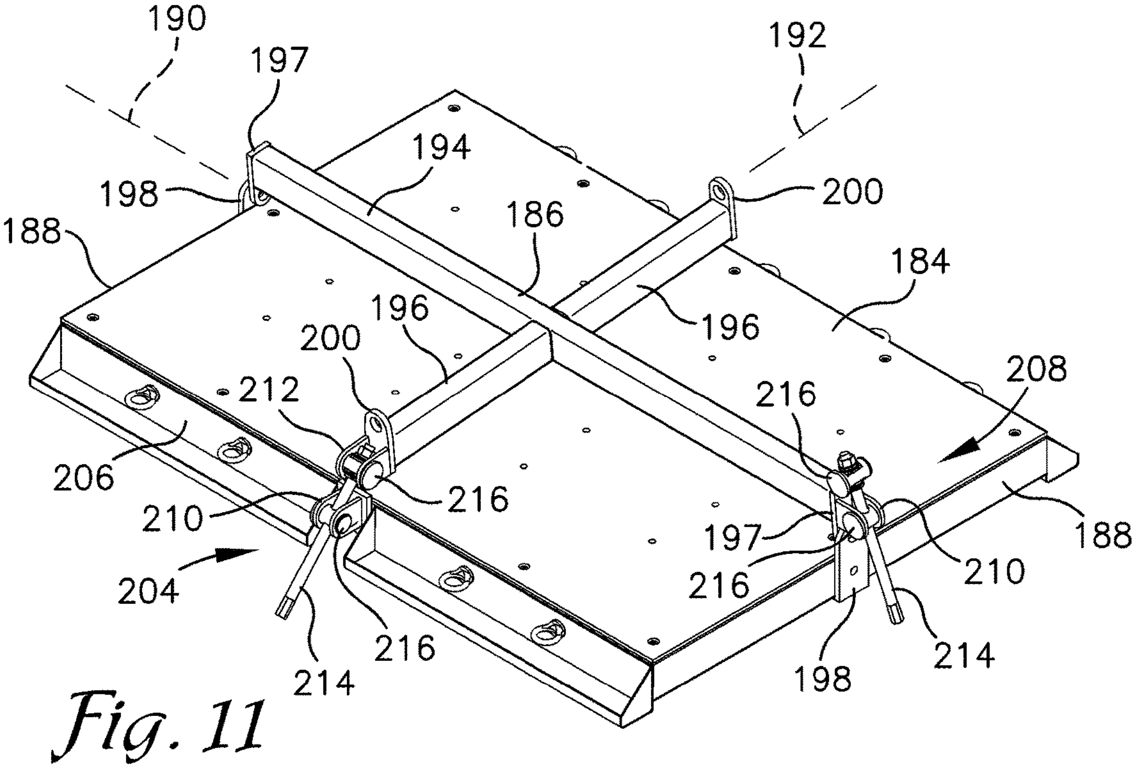
FIG. 11 is a view similar to FIG. 10 and illustrates the second modified lift deck with the tilt table removed to show a tilt frame supported thereon to enable it to pivot relative to the lift deck about a first axis and to enable the tilt table to pivot relative to the tilt frame about a second axis.
Figure 12:
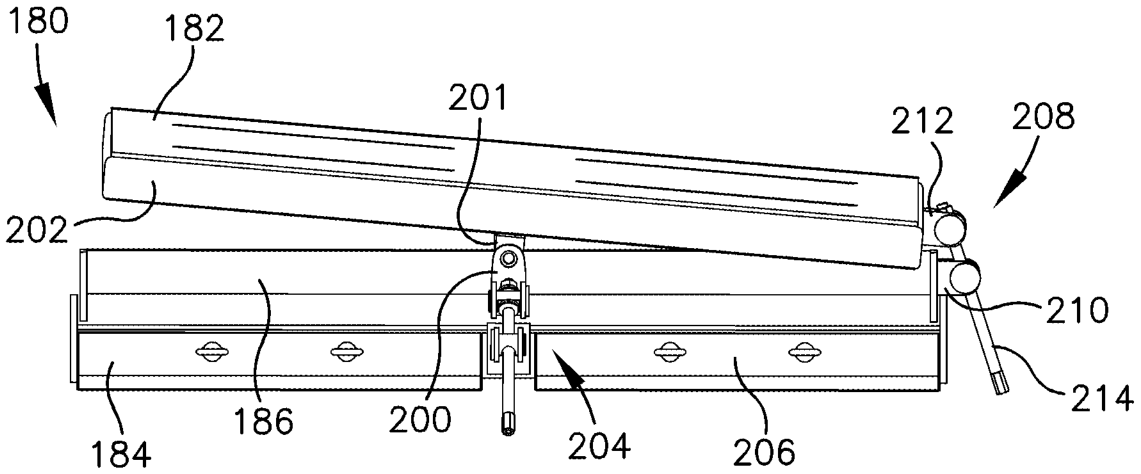
FIG. 12 is a left side elevation view of the second modified lift deck and the tilt table.
Figure 13:
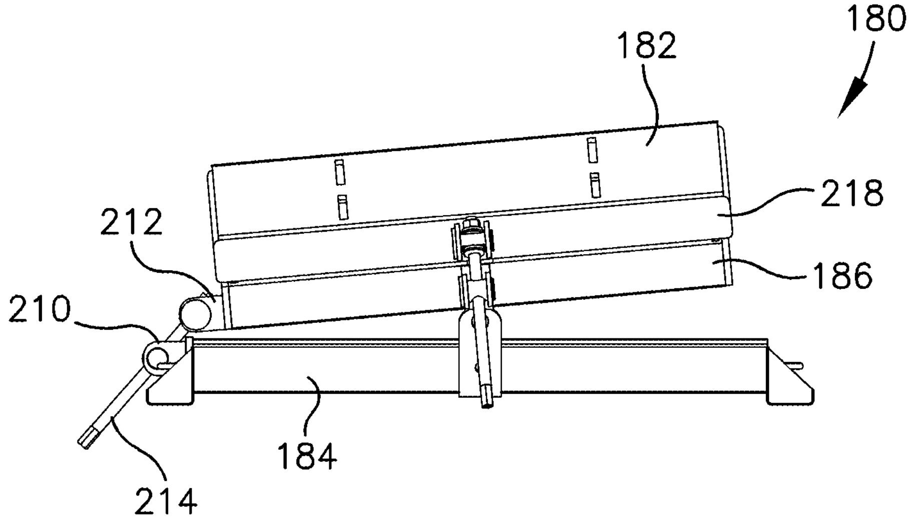
FIG. 13 is a rear end elevation view of the second modified lift deck and the tilt table.

FIG. 9 illustrates a modified lift platform assembly 164 which includes a plurality of angularly oriented load support arm assemblies 162. Each assembly 162 includes an outwardly extending arm 166, each arm having a load contact pad 168 on a contact pad post 170 upstanding from an end of the arm 166. The arms 166 may be telescoping sections to adjust the length thereof. Additionally, the posts 170 may be adjustable in length to adjust the vertical position of the contact pad 168 thereon. The arm assemblies 162 may be provided to support loads 10 which are longer or wider than the platform assembly 164. The respective lengths of the arms 166 and the posts 170 may be adjusted to support a load 10 having an irregular shape in a desired orientation.

FIGS. 10 through 13 illustrate an embodiment of a lift platform assembly 180 which is similar to the lift platform assemblies 142 and 164, but modified to accommodate the addition of a tilting or tilt table 182 to a lift deck 184 thereof which can be tilted through a limited angular range in a fore and aft or side to side direction or a combination thereof. The tilting capability of the tilt table 182 enables the table to engage loads 10 which have an irregular lower shape without dropping a portion of the load 10 while receiving it or which requiring manual lifting of a portion of a component to offload it. The tilting capability of the tilt table 182 also enables a user to reorient a load 10 to align fastening means such as bolts and bolt holes on the load and the vehicle frame. The illustrated platform assembly 180 includes a tilt frame 186 which is pivotally mounted on front and rear ends 188 of the lift deck 184 for tilting of the tilt frame 186 laterally about a longitudinal or fore and aft axis 190 (FIG. 11) of the assembly 180. The tilt table 182 is pivotally mounted on the tilt frame 186 to enable tilting of the tilt table 182 fore and aft about a lateral or side to side axis 192.

More particularly, the illustrated tilt frame 186 is a cruciform or cross shaped and formed by an elongated longitudinal tilt frame member 194 having a pair of tilt frame arms 196 extending laterally from opposite sides thereof. End brackets 197 mounted on outer ends of the longitudinal member 194 are pivotally connected to front and rear tilt frame end brackets 198 secured to front and rear ends 188 of the lift deck 184 to enable tilting the tilt frame 186 about the longitudinal axis 190 relative to the lift deck 184. Outer ends of the arms 196 have upwardly extending brackets 200 to which downwardly extending brackets 201 on side members 202 of the tilt table 182 are pivotally connected to enable tilting of the tilt table 182 about the lateral axis 192 relative to the tilt frame 186.

In order to fix a side tilt angle of the tilt frame 186 relative to the lift deck 184, a side tilt adjustment assembly or side tilt assembly 204 is engaged between a side member 204 of the lift deck 184 and one of the side brackets 200 of the tilt frame 186. Similarly, to fix an end tilt angle of the tilt table 182 relative to the tilt frame 186, an end tilt adjustment assembly or end tilt assembly 208 is engaged between an end bracket 198 of the lift deck 184 and an end bracket 197 of the longitudinal member 194 of the tilt frame 186. The side tilt assembly 204 and the end tilt assembly 208 are substantially similar in construction and operation. Each of the tilt assemblies 204 and 208 includes a relative stationary base clevis 210 and a relatively movable tilt clevis 212. The side tilt assembly 204 includes a base clevis 210 is secured to a side member 206 of the lift deck 184 and a tilt clevis 212 secured to a side bracket 200 of an arm 196 of the tilt frame 186. A threaded rod 214 extends through tilt pins 216 of the clevises 210 and 212 and can be rotated to move the tilt clevis 212 toward or away from the base clevis 210. Similarly, the end tilt assembly 208 includes a base clevis 210 secured to an end bracket 197 of the tilt frame 186 and a tilt clevis 212 secured to an end member 218 (FIG. 10) of the tilt table 182. A threaded rod 214 extends through tilt pins 216 of the clevises 210 and 212 and can be rotated to move the tilt clevis 212 toward or away from the base clevis 210. It is foreseen that other configurations of tilt mechanisms could be employed to adjustably tilt the tilt table 182 relative to the lift deck 184.

Referring to FIGS. 15-19, an embodiment of an agile mobile scissor lift apparatus 250 is illustrated. The apparatus 250 is functionally similar to the apparatus 1; however, the apparatus 250 has a number of refinements which provide a high degree of precise movements of the apparatus and components of the apparatus to facilitate lifting loads 10 (FIG. 2), such as battery units (not shown) of electric vehicles, for maintenance of the vehicles.

The illustrated apparatus 250 includes a rectangular base frame 254 formed by elongated front and back end members 258 and left and right lateral or side members 260, which are joined, as by welding, to form base corner joints or intersections 262. A caster unit 265 is secured to the base frame 254 at each corner joint 262. The caster units 265 cooperate to support the base frame 265 above a support surface 267, such as a concrete floor of a vehicle maintenance facility. A steering handle 270 is connected to the front end member 258 of the base frame 254 to control the direction of movement of the apparatus 250 about the floor 267. It is foreseen that the steering handle 270 may be pivotally connected to the base frame 254.

The apparatus 250 includes a motorized lift mechanism 275 which supports, lifts, and lowers a load 10 (FIG. 2), such as a battery unit of an electric vehicle or the like, for the maintenance of vehicles. Generally, the lift mechanism 275 includes a load platform assembly 277, a scissor linkage 280, and lift actuators 282. The scissor linkage 280 connects the load platform assembly 275 to the base frame 254, while the lift actuators 282 function to extend and retract the scissor linkage 280 to thereby lift and lower a load 10 supported by the load platform assembly 275.

Figure 15:
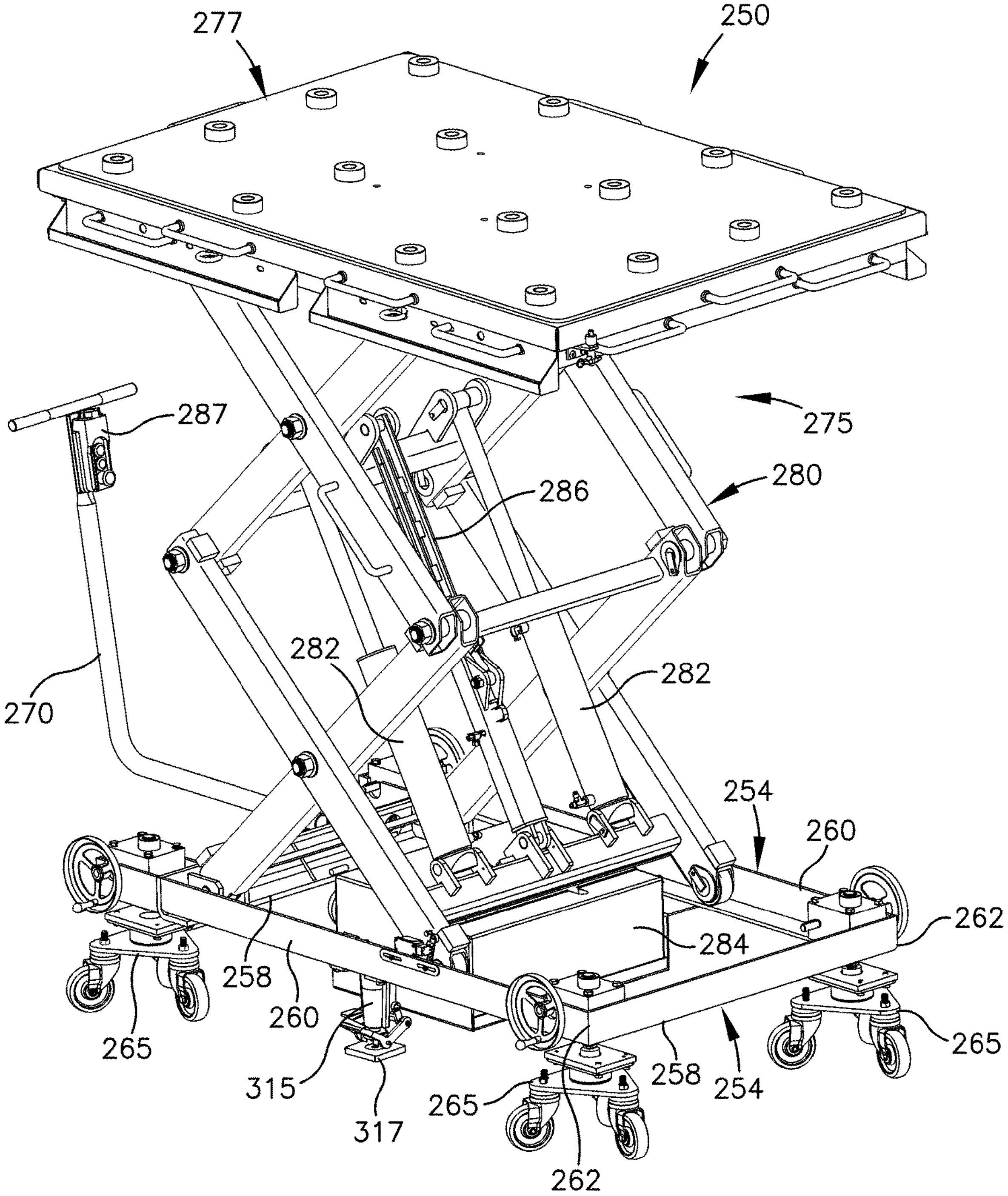
FIG. 15 is a perspective view of an embodiment of an agile mobile scissor lift apparatus according to the present invention.
Figure 16:
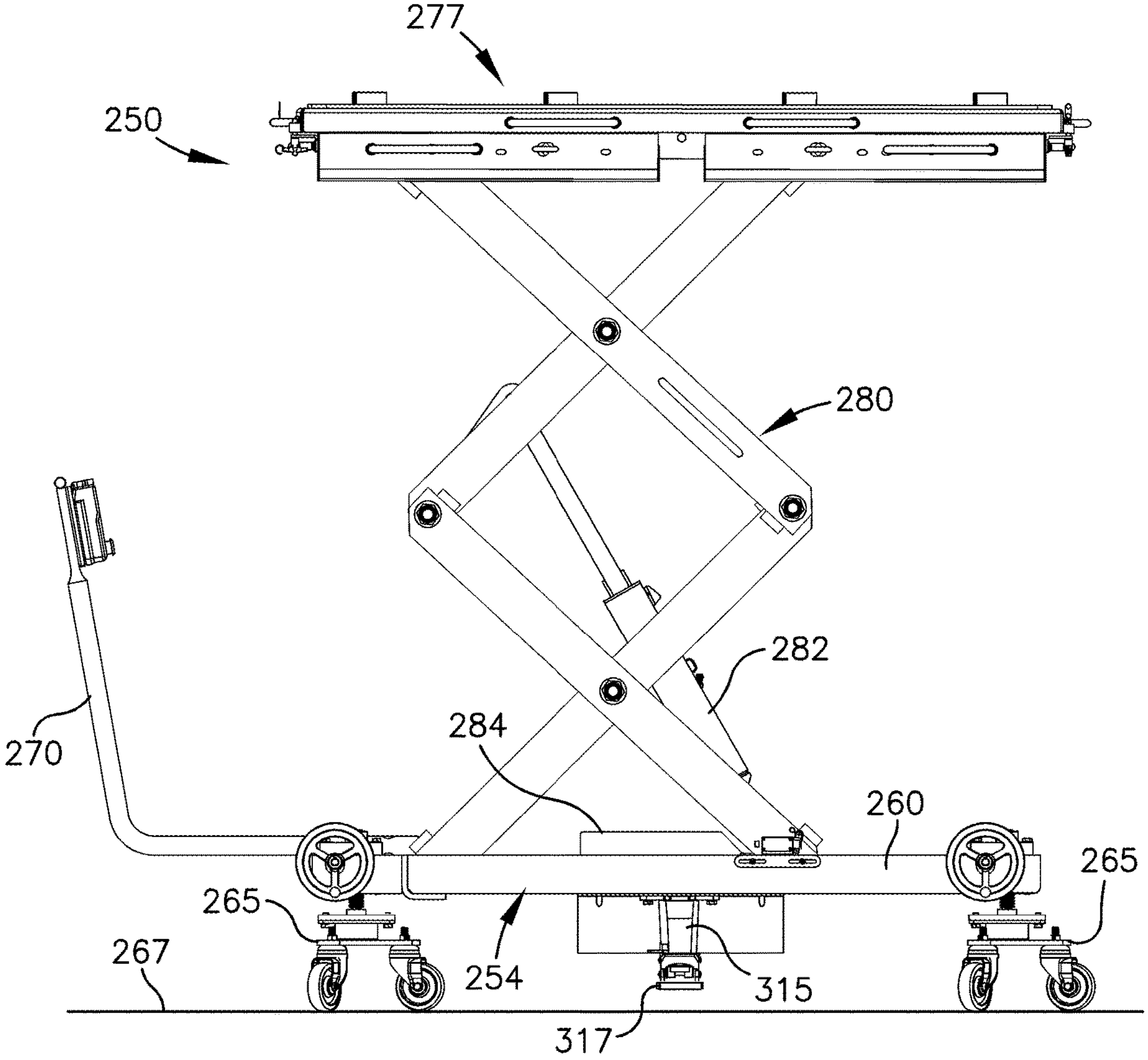
FIG. 16 is a side elevational view of the agile mobile scissor lift apparatus.

The scissor linkage 280 may be substantially similar to the scissor mechanisms 100 (FIG. 1) in construction and operation. The actuators 282 may be similar to the hydraulic actuators or cylinders 112 (FIG. 1) and may be controlled by hydraulic components 24, similar to those illustrated diagrammatically in FIG. 14, to extend and retract the scissor linkage 280 to thereby lift and lower the load platform assembly 275. The hydraulic control components 24 may be housed in a hydraulic enclosure 284 (FIG. 15). The control components 24 may include a hydraulic control pendant or unit 287 which is connected thereto by a control cable (not shown) and has the up/down switches 128 (FIG. 14) thereon.

The illustrated control pendant 287 includes a magnet or magnets to retain it on a recessed area of the steering handle 270.

The valves of a hydraulic actuator 282 are typically closed unless the cylinders are actively extending or retracting. Thus, when the load platform assembly 277 and load 10 thereon are lifted, the actuators 282 will hold the platform assembly 277 in place. In order to more positively limit undesired lowering of the load platform assembly 277, such as by failure of the actuators 282, the illustrated scissor linkage 280 includes a latch mechanism 286 (FIG. 15) which is engaged with the same components of the scissor linkage 280 as the actuators 282. The latch mechanism 290 includes a pawl and ratchet mechanism (not detailed) in which a pawl rides over spaced apart stop members during extension of the actuators 282. If the actuators 282 were to fail, the platform assembly 277 would lower a maximum of the distance between two adjacent stop members. In order to lower the platform without hindrance from the latch mechanism 290, it is necessary to lift the platform assembly 277 until the pawl engages the next stop member, which causes retraction of the pawl. At that point, the platform assembly 277 may be lowered without interference by the pawl. A ratcheting latch arrangement which functions in a similar manner is described in U.S. Pat. No. 10,745,259, which is incorporated herein in its entirety by reference.

Figure 17:
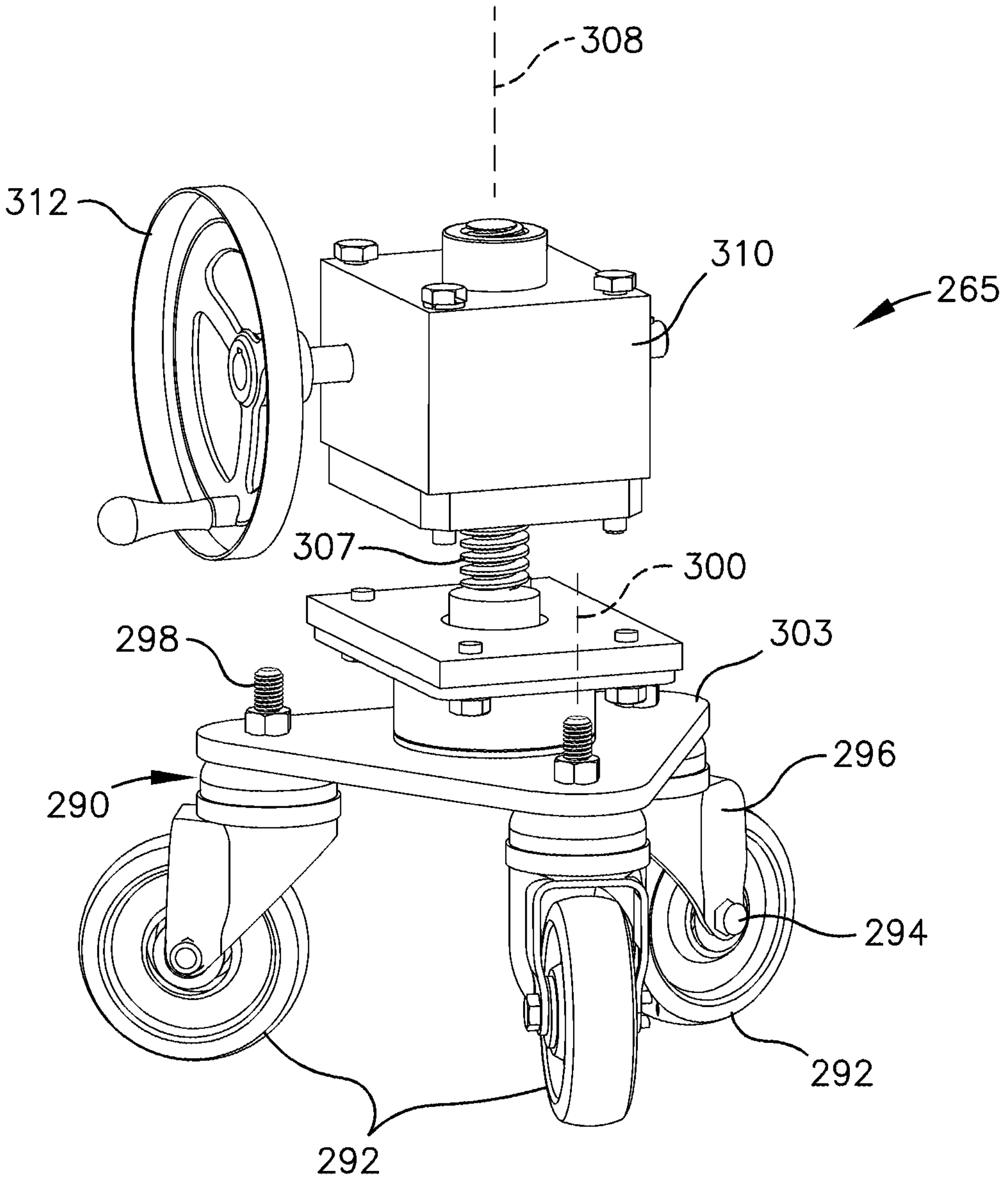
FIG. 17 is an enlarged perspective view of an embodiment of a height adjustable swivel caster unit employed on the lift apparatus.

Referring to FIG. 17, the illustrated apparatus 250 is provided with the swivel caster units 265 for mobility. In general, a swivel caster assembly 290 includes a caster wheel 292 mounted and rotating on a caster axle 294 extending across the end of a swivel fork 296 rotatably mounted on a swivel mounting shaft 298 through which a normally vertical swivel axis 300 extends. Friction of the caster wheel 292 with a surface 267 tends to cause the caster fork 296 to follow the direction of travel of the structure on which it is located because of a displacement between the swivel axis 300 and the swivel axle 294, which forms an axis of rotation for the caster wheel 292. However, any change in the direction of motion of the structure causes the caster 290 to pivot around its point of contact with the floor, which can create an undesirable lurch or "throw" of the structure on which the casters are employed in a non-desired direction. To overcome this tendency, so-called zero-throw caster units have been developed. Zero-throw caster units are also known as triple caster units and theater casters, from their use in moving theater scenery on a set. A typical zero-throw caster unit includes three caster wheels mounted on a caster plate which is rotatably mounted on the structure on which it is used. Free rotation of the caster plate, combined with free pivoting of the individual casters on the plate, overcomes the lurching tendency of the structure on which they are mounted when a change in direction of motion is attempted.

The illustrated caster unit 265 is a zero-throw type caster assembly and includes a triangular caster plate 303 which rotatably engages a caster unit shaft 307 extending in perpendicular relation to the caster plate 303 along a caster shaft axis 308. The caster plate 303 has three of the swivel caster assemblies 290 mounted thereon in a triangular pattern, such as at the corners of the triangular caster plate 303. The illustrated caster unit 265 is adjustable in height to enable the apparatus 250 to be leveled because of possible irregularities in the support surface 267. The illustrated caster unit shaft 307 is a threaded jack screw and passes through a caster height adjustment gear unit 310 having a gear arrangement therein (not shown) which enables rotation of a hand wheel or crank 312 to rotate the shaft 307 through a threaded nut (not shown) within the gear unit 310 to thereby move the caster plate 303 vertically relative to the base frame 254. The gear unit 310, along with the swivel caster assembly 290, is secured to the base frame 254 at one of the corners 262 thereof. In the illustrated apparatus 250, the hand wheel 312 has a shaft which passes through an upstanding flange of one of the side members 260. In the illustrated apparatus 250, components of the front caster units 265 are mounted on the front side of the front end members 258 of the base frame 254 on suitable brackets. It is foreseen that the base frame 254 could, alternatively be configured in such a manner that the caster units 265 could be mounted inside the base frame 254.

Figure 19:
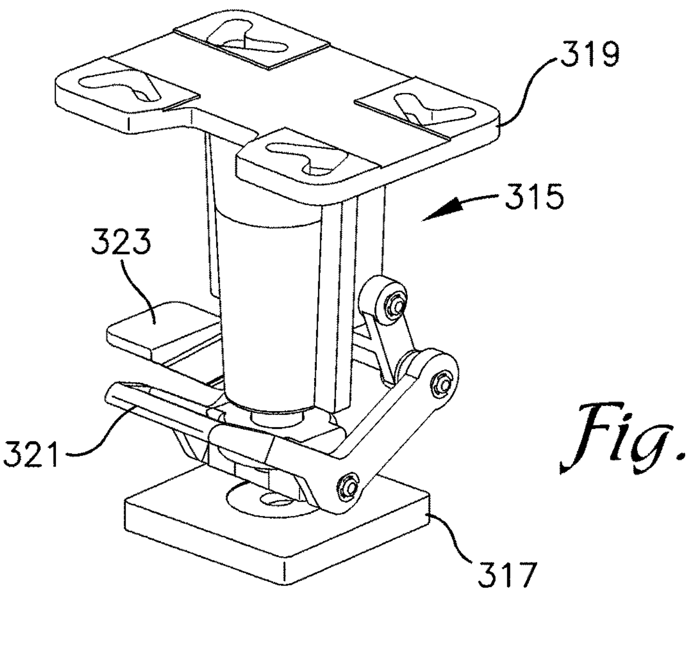
FIG. 19 is an enlarged perspective view of an embodiment of a latching floor brake employed on the lift apparatus.

It is desirable to fix the position of the apparatus 250 during lifting and lowering of a load 10 for stability and safety. Although some caster assemblies are provided with individual brakes to fix their position, it is not practical to set and release the twelve caster assemblies 290 provided on the apparatus 250. For this reason, the illustrated apparatus 250 is provided with a pair of floor locks or brake units 315, extending downwardly from each of the side members 260. Referring to FIG. 19, each floor brake unit 315 includes a brake pad 317 on a shaft which can be lowered into resilient frictional contact with the support surface 267 to fix the position of the apparatus 250 relative to the surface 267. The illustrated brake unit 315 includes a mounting plate 319 which may be secured to a side member 260 or a bracket attached thereto. The unit 315 has set or brake pedal 321 which latches the brake pad 317 into contact with the surface 267. The brake unit 315 has a release pedal 323 which can be operated to release and retract the brake pad 317. The floor brake unit 315 may be functionally similar to a floor engaging "leg" disclosed in U.S. Pat. No. 4,655,466 which is incorporated herein in its entirety by reference.

Figure 18:
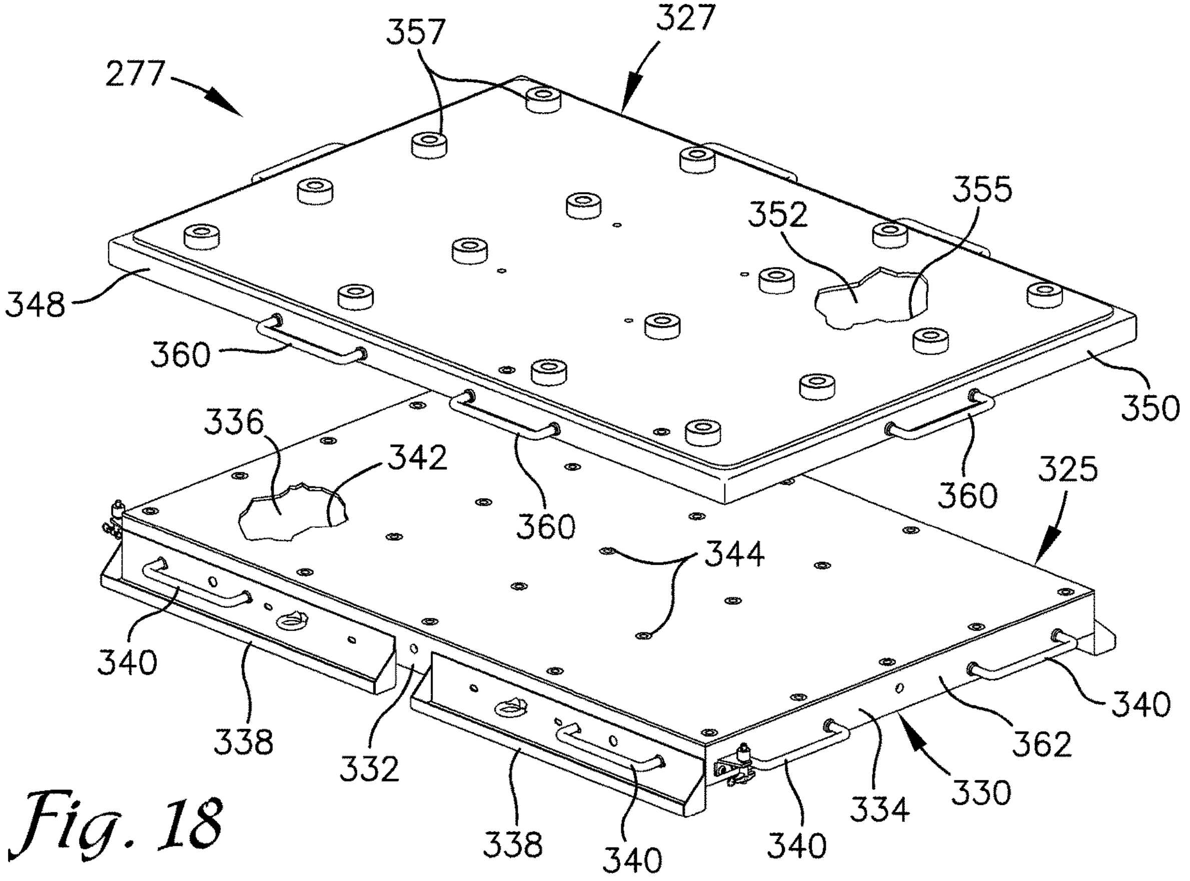
FIG. 18 is an enlarged perspective view of a movable load table according to the present invention, shown separated from a load deck of the lift apparatus.

Referring to FIG. 18, the illustrated load platform assembly 277 includes a planar load deck 325 on which a load table or slip plate 327 is slidably positioned. Structurally, the load deck 325 is substantially similar to the lift platform assembly 78 (FIG. 1) and 142 (FIG. 6). The load deck 325 includes a rectangular load deck frame 330 formed by laterally spaced side frame members or plates 332 which are joined to fore and aft spaced end frame members or plates 334. An upper deck plate 336 is joined to top surfaces of the load deck frame members 332 and 334. The illustrated load deck 325 is provided with tool channels or pans 338 attached to the side frame members 332. Additionally, the side frame members 332 and end members 334 may be provided with handles 340 for steadying the apparatus 250 during use thereof. An upper surface of the illustrated deck plate 336 may be covered by a polymer or plastic plate 342 on which is provided an array of ball bearings 342 which are regularly spaced thereon.

The load table 327 is constructed in a manner similar to the load deck 325 and includes a load table frame 345 formed by side frame members or plates 348 which are joined with end frame members or plates 350. The frame 345 is closed by a load table plate 352 which is covered by a polymer or plastic plate 355. The plate 355 has an array of rubber or resilient bumpers or pads 357 which are regularly spaced thereon. The side members 348 and end members 350 may be provided with handles 360.

The dimensions of the load table 327 are such that the length and width of the load table frame 346 is greater than the length and width of the load deck frame 330, whereby portions of the load table 327 overlap the load deck 325. The load table 327 need not be joined to the load deck 325 and may be temporarily placed thereon when needed. When placed on the load table 327 is positioned on the load deck 325, the load table plate 352 rests on the ball bearings 342 whereby the load table 327 is movable relative to the load deck 325. Movement of the load table 327 is limited by contact of overhanging side and end frame members 348 and 350 with an outer periphery 362 of the load deck 325 which is formed by the side and end frame members 346 and 348. The handles 340 of the load deck 325 may be used to steady the apparatus 250 as the handles 360 of the load table 327 are used to position the load table 327 bearing a load 10.

The movability of the load table 327 relative to the load deck 325 provides for precise positioning of a load supported on the apparatus 250 in combination with the ease of movement of the base frame 254 provided by the caster units 265. The load deck 325, minus the movable load table 327, may be used with the load support assemblies 162 (FIG. 9) or may be used with a tilt table 182, such as that shown in FIGS. 10-13.

It is to be understood that while certain forms of the present invention have been described and illustrated herein, it is not to be limited to the specific forms or arrangement of parts described and shown.

What is claimed as new and desired to be secured by Letters Patent is:

1. A mobile lift apparatus comprising:

a base frame having opposite sides;

a lift mechanism mounted on the base frame and operable to lift and lower a load;

a plurality of caster units connected to and extending below the base frame, the plurality of caster units cooperating to enable the base frame to be moved about a support surface of the apparatus, each of the caster units including:

a caster plate pivotally engaged with the base frame to enable pivoting freely about a substantially vertical plate axis; and a plurality of swivel casters pivotally engaged with the caster plate in mutually spaced relation and in such a manner as to enable pivoting freely about respective, substantially vertical swivel axes; and at least one floor brake mechanism secured to the base frame, the floor brake mechanism including a brake pad which is selectively extended into braking contact with the support surface in a brake position thereof to secure a position of the apparatus and which is retracted to a released position to enable movement of the apparatus on the support surface.

2. The mobile lift apparatus as set forth in claim 1 wherein:

each of the plurality of caster units is positioned at a corner of the base frame and is adjustable in height relative to the base frame to enable leveling of the base frame on an uneven support surface.

3. The mobile lift apparatus as set forth in claim 1 wherein each caster unit includes:

a substantially vertical caster unit shaft engaged with the base frame in such a manner as to enable a vertical position of the shaft to be selectively adjusted relative to the base frame;

the caster plate being a triangular caster plate pivotally engaged with the caster unit shaft to enable pivoting freely about the substantially vertical plate axis extending through the caster unit shaft; and the plurality of casters including three swivel casters pivotally engaged with the caster plate in a spaced apart, triangular relation and in such a manner as to enable pivoting freely about the respective, substantially vertical swivel axes.

4. The mobile lift apparatus as set forth in claim 1 wherein:

a respective one of the at least one brake mechanism is secured to the base frame on each of the opposite sides thereof in laterally aligned relation.

5. The mobile lift apparatus as set forth in claim 1 wherein the lift mechanism includes:

a substantially planar load deck adapted to support the load to be lifted by the apparatus;

a scissor linkage connecting the load deck to the base frame to enable lifting or lowering of the load deck respectively by extension or retraction of the scissor linkage; and an actuator engaged with the scissor linkage in such a manner as to enable selective extension and retraction of the scissor linkage.

6. The mobile lift apparatus as set forth in claim 1 wherein the lift mechanism includes:

a substantially planar load deck adapted to support the load to be lifted by the apparatus;

a substantially planar load table supported on the load deck in such a manner as to enable limited movement of the load table relative to the load deck to thereby adjust a position of the load positioned on the load table;

a scissor linkage connecting the load deck to the base frame to enable lifting or lowering the load deck respectively by extension or retraction of the scissor linkage; and an actuator engaged with the scissor linkage in such a manner as to enable selective extension and retraction of the scissor linkage.

7. The mobile lift apparatus as set forth in claim 6 and including:

an array of bearings engaged between the load deck and the load table to facilitate movement of the load table relative to the load deck.

8. The mobile lift apparatus as set forth in claim 6 wherein:

the load table has a limit member which engages the load deck in such a manner as to limit movement of the load table relative to the load deck.

9. A mobile lift apparatus comprising:

a base frame having first and second lateral frame sides;

a lift mechanism mounted on the base frame and operable to lift and lower a load;

a plurality of caster units, each of the plurality of caster units positioned proximate a respective corner of the base frame, the caster units cooperating to enable the base frame to be moved about a support surface of the apparatus;

each of the plurality of caster units including:

a caster plate pivotally engaged with the base frame to enable pivoting freely about a substantially vertical plate axis; and a plurality of swivel casters pivotally engaged with the caster plate in mutually spaced relation and in such a manner as to enable pivoting freely about respective, substantially vertical swivel axes; and a respective floor brake mechanism secured to each of the first and second lateral frame sides of the base frame, each floor brake mechanism including a brake pad which is selectively extended and latched into braking contact with the support surface in a brake position thereof to secure a position of the apparatus and which is released and retracted to a released position to enable movement of the apparatus on the support surface.

10. The mobile lift apparatus as set forth in claim 9 wherein:

each caster unit is adjustable in height relative to the base frame to enable leveling of the base frame on an uneven support surface.

11. The mobile lift apparatus as set forth in claim 9 wherein each caster unit includes:

a substantially vertical caster unit shaft engaged with the base frame in such a manner as to enable a vertical position of the shaft to be selectively adjusted relative to the base frame;

the caster plate being triangular and being pivotally engaged with the caster unit shaft to enable pivoting about the substantially vertical plate axis extending through the caster unit shaft; and three of the swivel casters pivotally engaging the caster plate in a spaced apart, triangular relation and in such a manner as to enable pivoting about respective, substantially vertical swivel axes.

12. The mobile lift apparatus as set forth in claim 9 wherein the lift mechanism includes:

a substantially planar load deck adapted to support the load to be lifted by the apparatus;

a substantially planar load table supported on the load deck in such a manner as to enable limited movement of the load table relative to the load deck to thereby adjust a position of the load positioned on the load table;

a scissor linkage connecting the load deck to the base frame to enable lifting or lowering the load plate respectively by extension or retraction of the scissor linkage; and an actuator engaged with the scissor linkage in such a manner as to enable selective extension and retraction of the scissor linkage.

13. The mobile lift apparatus as set forth in claim 12 and including:

an array of bearings positioned on the load deck in spaced apart relation for engagement by the load table to facilitate movement of the load table relative to the load deck; and the load table includes a plurality of depending limit members which engage an outer periphery of the load deck to thereby limit movement of the load table relative to the load deck.

14. A mobile lift apparatus comprising:

a base frame having opposite sides;

a plurality of caster units connected to and extending below the base frame, the plurality of caster units adapted for supporting the base frame on a support surface and allowing rolling movement of the mobile lift apparatus relative to the support surface;

each of the caster units including:

a caster plate pivotally engaged with the base frame to enable pivoting freely about a substantially vertical plate axis; and a plurality of swivel casters pivotally engaged with the caster plate in mutually spaced relation and in such a manner as to enable pivoting freely about respective, substantially vertical swivel axes;

a load deck connected to the base frame by a lift mechanism for raising and lowering the load deck relative to the base frame; and a load table supported on an array of bearings mounted on the load deck to facilitate movement of the load table relative to the load deck to thereby adjust a position of a load positioned on the load table relative to the load deck.

15. The mobile lift apparatus as in claim 14 further comprising:

a limit member on the load table engageable with the load deck to limit movement of the load table relative to the load deck.

16. The mobile lift apparatus as in claim 14 wherein the lift mechanism comprises:

a scissor linkage connecting the load deck to the base frame to enable lifting or lowering the load deck respectively by extension or retraction of the scissor linkage; and an actuator engaged with the scissor linkage in such a manner as to enable selective extension and retraction of the scissor linkage.

17. The mobile lift apparatus as set forth in claim 14 further comprising at least one floor brake mechanism secured to the base frame, each of the at least one floor brake mechanism including a respective brake pad which is selectively extended into braking contact with the support surface in a brake position thereof to secure a position of the apparatus and which is retracted to a released position to enable movement of the apparatus on the support surface.

18. The mobile lift apparatus as set forth in claim 17 wherein a respective one of the at least one floor brake mechanism is secured to the base frame on each of the opposite sides thereof in laterally aligned relation.

19. A rolling table comprising:

a base frame;

a plurality of caster units connected to and extending below the base frame, the plurality of caster units adapted for supporting the base frame on a support surface and allowing rolling movement of the rolling table relative to the support surface; each of the plurality of caster units being adjustable in height relative to the base frame;

each of the caster units including:

a caster plate pivotally engaged with the base frame to enable pivoting freely about a substantially vertical plate axis; and a plurality of swivel casters pivotally engaged with the caster plate in mutually spaced relation and in such a manner as to enable pivoting freely about respective, substantially vertical swivel axes;

a load deck connected to and supported above the base frame; and a load table supported on an array of bearings mounted on the load deck to facilitate movement of the load table relative to the load deck to thereby adjust a position of a load positioned on the load table relative to the load deck.

20. The rolling table as in claim 19 further comprising:

a limit member on the load table engageable with the load deck to limit movement of the load table relative to the load deck.

21. The rolling table as in claim 19 further comprising a lift mechanism connecting the load deck to the base frame to enable lifting or lowering the load deck relative to the base frame.

22. The rolling table as in claim 21 wherein the lift mechanism comprises:

a scissor linkage connecting the load deck to the base frame to enable lifting or lowering the load deck respectively by extension or retraction of the scissor linkage; and an actuator engaged with the scissor linkage in such a manner as to enable selective extension and retraction of the scissor linkage.

* * * * *